United States Patent
Graber et al.

(10) Patent No.: US 11,556,185 B1
(45) Date of Patent: Jan. 17, 2023

(54) SYSTEM TO DETECT USER INPUT USING A PRESSURE SENSOR

(71) Applicant: AMAZON TECHNOLOGIES, INC., Seattle, WA (US)

(72) Inventors: Sarah Graber, Seattle, WA (US); Douglas W. Moskowitz, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/181,327

(22) Filed: Feb. 22, 2021

(51) Int. Cl.
| G06F 3/02 | (2006.01) |
| G06F 1/16 | (2006.01) |
| G01C 5/06 | (2006.01) |

(52) U.S. Cl.
CPC ............. G06F 3/0202 (2013.01); G01C 5/06 (2013.01); G06F 1/163 (2013.01)

(58) Field of Classification Search
CPC .. G06F 2203/04105; G06F 1/163; G01C 5/06
See application file for complete search history.

(56) References Cited

U.S. PATENT DOCUMENTS

| 2017/0192599 A1* | 7/2017 | Jin ...................... A63F 13/2145 |
| 2020/0064952 A1* | 2/2020 | Gupta ..................... G01L 1/142 |

\* cited by examiner

Primary Examiner — Mark Edwards
Assistant Examiner — Chayce R Bibbee
(74) Attorney, Agent, or Firm — Lindauer Law, PLLC

(57) ABSTRACT

A system uses a barometer to determine both a user interface event and a change in elevation. Portable devices are often limited by space to provide a user with features that make a product useful. The system uses the barometer to measure air pressure within a cavity of a housing of a wearable device. The cavity is enclosed by a cover that appears as a physical button. The cover is attached to the housing by a flexible seal that allows the cover to move in response to changes in air pressure or physical touch. If movement of the cover causes a change in air pressure in the cavity beyond a threshold, the change is interpreted to be a user input event. Otherwise, the change in air pressure is determined to be a change in altitude. Using a barometer to determine user input allows for a compact wearable device.

20 Claims, 9 Drawing Sheets

SYSTEM TO DETECT USER INPUT USING A PRESSURE SENSOR

BACKGROUND

Design options for wearable devices are often constrained by a physical size that is comfortable to a user. Reducing a number of mechanical components to detect user interface actions may also be useful for improving features provided by a wearable device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
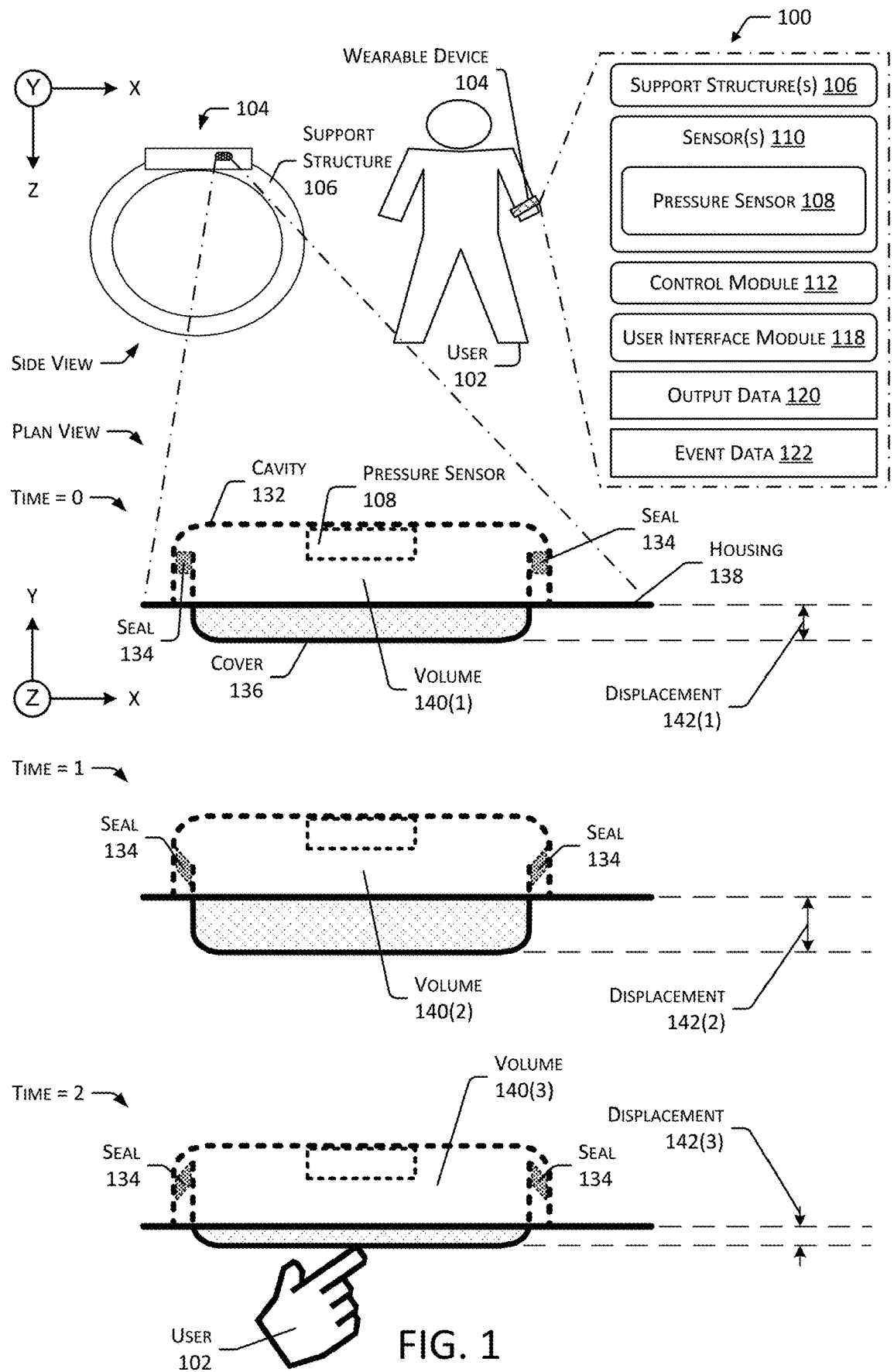
FIG. 1 is an illustrative system that includes a user and a wearable device that uses a pressure sensor to determine a user input event, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

A wearable device may be an important part of a user's lifestyle. The benefits provided by a wearable device may be constrained by how much space for electronic and mechanical components may fit within a size that may be comfortably worn by a user. Similarly, portable devices, such as tablets and smartphones, may be constrained by a size that may be carried by a user. For example, a wearable device may be used to determine biomedical data that helps a user to monitor their health. By reducing the quantity or size of components in a wearable device or a portable device, volume within the wearable device or portable device is available for other uses such as other sensors, additional battery capacity, and so forth. The reduction in quantity of mechanical components may also reduce the overall cost to produce the wearable device or portable device.

A traditional wearable device may incorporate electromechanical buttons that add cost and consume volume within the device, may utilize capacitive buttons that add cost and are prone to false detections, or may omit altogether the convenience of buttons for user input.

Described in this disclosure are apparatus and techniques to determine user input using a sensor that determines atmospheric pressure, such as a barometer or altimeter. Output from the pressure sensor may be used to determine user input while still providing information about altitude and information about barometric conditions. This allows the pressure sensor to perform multiple functions, eliminating discrete components, the associated cost of those components, and their use of internal volume within the wearable device.

A pressure sensor may perform dual functions: (a) detecting barometric pressure due to weather or altitude, and (b) determining a change in pressure resulting from a user input event. The housing of a wearable device may comprise a cavity that includes a barometer, altimeter, or some other type of sensor that measures pressure. The cavity may be enclosed by a cover that appears as a physical button. The cover may be attached to the housing by a flexible seal that allows the cover to move in response to changes in pressure as well as allowing the cover to move in response to physical touch. Because the cover may move responsive to different types of pressure, a change in air pressure in the cavity is analyzed to determine whether the change in pressure is due to a change in altitude or due to physical touch. If the change in pressure changes faster than would be expected from a change in altitude or from a change in weather, then the change in pressure is determined to be a result of a user pressing the cover. Otherwise, the change in pressure is determined to be a result from a change in altitude or from a change in weather.

Continuing with this example, an analysis of sensor data to determine whether a change in pressure is due to a change in altitude or due to physical touch may compare the sensor data to a threshold rate of change. For example, the sensor data may indicate a first plurality of measurements of pressure over a first time period. In this example, a user may be at sea level and ambient air pressure may be 1013 millibars. The air pressure within the cavity of the wearable device may also be 1013 millibars. The first plurality of measurements may indicate a rate of change over the first time period from 1013 millibars to 1025 millibars. The first time period may be 0.5 seconds. The change in air pressure corresponds to a change in altitude from sea level to 100 meters below sea level.

In this example, a 100-meter drop in altitude in under a second is not considered a change in altitude that is associated with a normal or safe change in a user's altitude. In this example, this change in air pressure is determined to be a result of a user pressing the cover and the change in air pressure is determined to be a user input event. If the rate of change in air pressure is greater than a threshold rate of change, then a pressure change event may be determined to be a user input event. Otherwise, if the rate of change in air pressure is less than the threshold rate of change, then the pressure change event may be determined to be an altitude change or a change in weather.

In the previous example, the user is at sea level, but in other examples, the user may be at different altitudes. For example, the cavity in the wearable device may comprise a vent or other passageway from a volume of air in the cavity to an ambient environment. The vent or passageway may be used to equalize air pressure within the cavity to match the air pressure of an ambient environment. With respect to the cavity, an outlet of the passageway is the ambient environment.

In some examples, instead of using a rate of change in pressure over a time period, a single pressure measurement may be used to determine whether air pressure within the cavity of the housing of the wearable device is due to a change in altitude or a user input event. For example, if a pressure sensor determines a single pressure measurement that is greater or less than air pressure associated with expected altitudes of a user, then the single pressure measurement may be determined to be a user input event. For example, if a single air pressure measurement is greater than a first threshold value and less than a second threshold value, then the single air pressure measurement may be determined to be a user input event. The first threshold value may be 1075 millibars and the second threshold value may be 309 millibars. 1075 millibars would be air pressure 100 meters below the lowest elevation on land. 309 millibars would be air pressure 100 meters above the highest elevation on land, the peak of Mt. Everest. In other examples, other first and second threshold values may be used.

In the examples above, a volume of air is enclosed within a cavity by a flexible seal and a cover. In other examples, the cavity in the housing of a wearable device may be open and uncovered. In such an example, a user pressing a finger over the opening of the cavity may create a pressure pulse of air. Determining whether a change in air pressure is a change in altitude or a user input event may be done similarly to the example above. In another example, a cavity may be within a band or other support structure of a wearable device. The band may be made of flexible or elastic material, such as an elastomer. In such an example, a user may press on a portion of the band that encloses the cavity, where the band may compress and create an increase in air pressure within the cavity. Some portion of the volume of air in the cavity in the band may be released into a connected cavity within the housing. The cavity in the housing may include a pressure sensor, where determining whether a change in air pressure is a change in altitude or a user input event may be done similarly to the example above.

By determining user input using a sensor that determines atmospheric pressure, a quantity or size of components in a wearable device or portable device may be reduced. By reducing the quantity or size of components in a wearable device or portable device, volume within the wearable device or portable device is available for other uses such as other sensors, additional battery capacity, and so forth. The reduction in quantity of mechanical components may also reduce the overall cost to produce the wearable device or portable device.

ILLUSTRATIVE SYSTEM

FIG. 1 is an illustrative system 100 that includes a user 102 and a wearable device 104 that uses a pressure sensor 108 to determine a user input event, according to one implementation.

The user 102 may be wearing a wearable device, wearable device 104. The wearable device 104 may be implemented in various physical form factors including, but not limited to, the following: wrist bands, torcs, arm bands, ankle bands, abdominal straps, headbands, eyeglasses, and so forth. In this example, a wrist band, depicted as support structure 106, may be attached to the wearable device 104 to maintain the wearable device 104 proximate to the user 102. In other examples, a portable device may use the pressure sensor 108 to determine a user input event. A portable device may be a tablet computer, a smartphone, a laptop computer, a hybrid of a laptop and tablet, a handheld gaming system, or some other computing device that is designed to be operated in a mobile or portable fashion.

A control module 112 may be used to direct operation of hardware or software components of the wearable device 104. For example, the control module 112 may comprise a hardware processor executing instructions that operate a pressure sensor 108. The pressure sensor 108 may be a barometer, an altimeter, or some other type of sensor 110 that measures pressure or pressure changes. A pressure sensor 108 may be a microelectromechanical system barometer.

A plan view of a portion of the wearable device 104 depicts a housing 138. The housing 138 comprises a sensor assembly that includes one or more of: a cavity 132, a pressure sensor 108, a seal 134, or a cover 136. The seal 134 may be between a perimeter of the cover 136 and one or more sides of the cavity 132, where a first volume 140 of air is bounded by one or more portions of: the cover 136, the seal 134, and the cavity 132. The cavity 132 may comprise one or more sides. In some implementations, a wearable device 104 housing 138 may include one or more cavities, such as the cavity 132, and one or more sensor assemblies. For example, the housing 138 may include a sensor assembly on one or more sides of the wearable device 104, including a side that includes a display. The pressure sensor 108 may be attached to one of the one or more sides of the cavity 132. The cover 136 may be a piece that is moveable in response to changes in air pressure or force applied by a user 102.

In this example, at the first time, time=0, the wearable device 104 is at a first altitude and the pressure of a first volume 140(1) of air may be equalized with the pressure of a first ambient environment. The first volume 140(1) of air may be enclosed by one or more portions of the cavity 132, the cover 136, and the seal 134. At the first time, the cover 136 is at a first distance between a surface of the cover 136 and the housing 138. The first distance is depicted as displacement 142(1). At the first time, the seal 134 is not distended or stretched due to either air pressure from the first volume 140(1) of air or from air pressure from the first ambient environment. At the first time, the air pressure of the first ambient environment at the first altitude is approximately equal to the air pressure of the first volume 140(1) of air.

At a second time, time=1, the control module 112 may determine a first plurality of measurements from the pressure sensor 108 over a first time period. The first plurality of measurements may indicate or be used to determine first one or more pressure values over the first time period. In some examples, a single measurement may comprise one or more readings of an output signal from imbalances in Wheatstone bridge piezoresistances, where the imbalance is due to a membrane being moved by air pressure. At the second time, the cover 136 is at a second distance between the surface of the cover 136 and the housing 138. The second distance is depicted as displacement 142(2). At the second time, the seal 134 is, relative to the first time, stretched outward in a direction away from the housing 138.

At the second time, the seal 134 may be distended or stretched because air pressure within the volume 140(2) of air is greater than air pressure of a second ambient environment. The pressure differential between the second volume 140(2) of air and the second ambient environment causes the cover 136 to move outward to equalize the pressure between the second volume 140(2) of air and the second ambient environment. In this example, air pressure of the second volume 140(2) of air may be greater than air pressure of the second ambient environment as a result of the user 102 moving from the first altitude to a second altitude, where the second altitude is higher than the first altitude. In some implementations, the cavity 132, cover 136, or other portion of the sensor assembly may comprise a vent or other passageway from the first volume 140 to the ambient environment. The vent or passageway may be used to equalize air pressure within the cavity to match the air pressure of an ambient environment over time. For example, the passageway may equalize pressure over a period of time greater than a period of time used to determine a user input event or a change in altitude. Because air pressure of the first volume 140 of air is not equalized within a period of time used to determine a user input event, pressure measurements within the period of time continue to indicate whether rates of change in air pressure are indicative of a user input event.

As described above, a cover 136 may include a passageway or hole. In this example, a change in air pressure may result from a user 102 covering the passageway or hole. For example, while a user 102 is pressing the cover 136 their finger may seal the passageway in the cover 136 during the press. The seal resulting from the user's finger may create a temporary volume of air enclosed by one or more portions of the cavity 132, the seal 134, the cover 136, and the user's finger. The temporary volume of air may be compressed due to a pressing motion of the user's finger, where the pressing motion creates a change in air pressure within the temporary volume of air. The one or more pressure values may indicate one or more of the pressure values from a time before the user 102 created the temporary volume of air with a finger and the pressing motion of the user's finger.

At the second time, the first one or more pressure values may be indicative of pressure data of the second volume 140(2) of air over the first time period. The first time period may be a period of time between the first time and the second time. The control module 112 may determine a first rate of change using the first one or more pressure values over the first time period. For example, with respect to the first one or more pressure values, a first pressure value may indicate 1013.25 millibars (mbar) and a second pressure value may indicate 1013.18 millibars. A difference between the first pressure value and the second pressure value equal to 0.07 mbar may be associated with a change in altitude of 0.5 meters (m). If the first time period is 1 second (sec), then the first rate of change in air pressure is 0.07 mbar/sec.

At the second time, based on the first rate of change being below a first threshold rate of change, the control module 112 may determine that the first plurality of measurements is indicative of a second altitude. In this example, the first threshold rate of change in air pressure may be 2.5 mbar/sec, which is equivalent to rising about 20 m per second, which is a small amount faster than a fast elevator. The control module 112 may determine, based on the first one or more pressure values, that the second altitude is 0.5 m, or 0.5 meters above the first altitude. The control module 112 may save a first value indicating the second altitude as event data 122, where the event data 122 may be used to update an application or user interface element displayed by the wearable device.

At a third time, time=2, the control module 112 may determine a second plurality of measurements from the pressure sensor 108 over a second time period. The second plurality of measurements may indicate or be used to determine second one or more pressure values over the second time period. At the third time, the cover 136 is at a third distance between the surface of the cover 136 and the housing 138. The third distance is depicted as displacement 142(3). At the third time, the seal 134 is, relative to the first time, stretched inward in a direction from the cover 136 toward the pressure sensor 108.

At the third time, the seal 134 may be distended or stretched because of force applied to the cover 136. For example, a user 102 may press the cover 136 and apply a force. The applied force to the cover 136 may move the cover 136 inward, causing the second volume 140(2) of air to be compressed, resulting in a third volume 140(3) of air. Because a same quantity of air enclosed by the cavity 132, seal 134, and cover 136 is held in a smaller volume, the air pressure of the third volume 140(3) is greater than the second volume 140(2) of air.

At the third time, the second one or more pressure values may be indicative of pressure data of the third volume 140(3) of air over the second time period. The second time period may be a period of time between the second time and the third time. The control module 112 may determine a second rate of change using the second one or more pressure values over the second time period. For example, with respect to the second one or more pressure values, a first pressure value may indicate 1013.18 millibars and a second pressure value may indicate 1025.32 millibars. A difference between the first pressure value and the second pressure value equal to 12.14 may be associated with a decrease in altitude of about 100.0 meters (m). If the second time period is 1 seconds (sec), then the second rate of change in air pressure is 12.14 mbar/sec.

At the third time, based on the second rate of change being greater than the threshold rate of change, the control module 112 may determine that the second plurality of measurements is indicative of a user input event. As described above, in this example, the threshold rate of change in air pressure may be 2.5 mbar/sec. The control module 112 may save a second value indicating the user input event as event data 122, where the event data 122 may be used to update an operating system, an application, or user interface element displayed by the wearable device. In this example, after the user 102 removes pressure from the cover 136, the cover 136 may return to being at the first distance from the housing 138.

The wearable device 104 may include at least one support structure 106 that supports one or more components. For example, the wearable device 104 may comprise a housing 138 or capsule that is attached to a wrist band, allowing the wearable device 104 to be retained on the wrist of the user 102, as shown in FIG. 1. The wrist band is depicted as the support structure 106. In another example, the wearable device 104, or a portion thereof, may comprise an adhesive patch to adhere to the user 102 during operation of the wearable device 104. Also shown in FIG. 1 is a side view of the wearable device 104 as shown worn on the arm of user 102.

The wearable device 104 may include, or receive data from, one or more other sensors 110. For example, a temperature sensor may be used to provide an indication of the body temperature of the user 102. The body temperature may then be used as an input to the control module 112 to provide health information to the user 102. These sensors 110 are discussed in more detail below with regard to FIG. 2. Data from the sensors 110 may be obtained to provide other information about physiological status, activity level, and so forth.

Output from the sensors 110 may also be used to determine operation of the control module 112. For example, the sensors 110 may include one or more accelerometers. If the accelerometers detect motion that exceeds a threshold value, the control module 112 may be operated to determine biomedical data. For example, if the user 102 has been running, the system 100 may operate to determine heart rate or blood oxygen levels. In another example, if the motion of the user 102 is less than a threshold value, the control module 112 may operate to determine other biomedical data. For example, if no movement has been detected for 2 minutes, such as if the user 102 is asleep or unconscious, the control module 112 may be operated to determine blood glucose levels.

A user interface module 118 may be configured to use one or more of altitude data, barometric data, or user input event data to produce output data 122. For example, based on user input event data indicating a button press, output data 122 may be generated. The user input event data may also be used by the operating system or by an application to indicate a selection, acceptance, rejection, or some other user interface action used to interact with the operating system or application.

Figure 2:
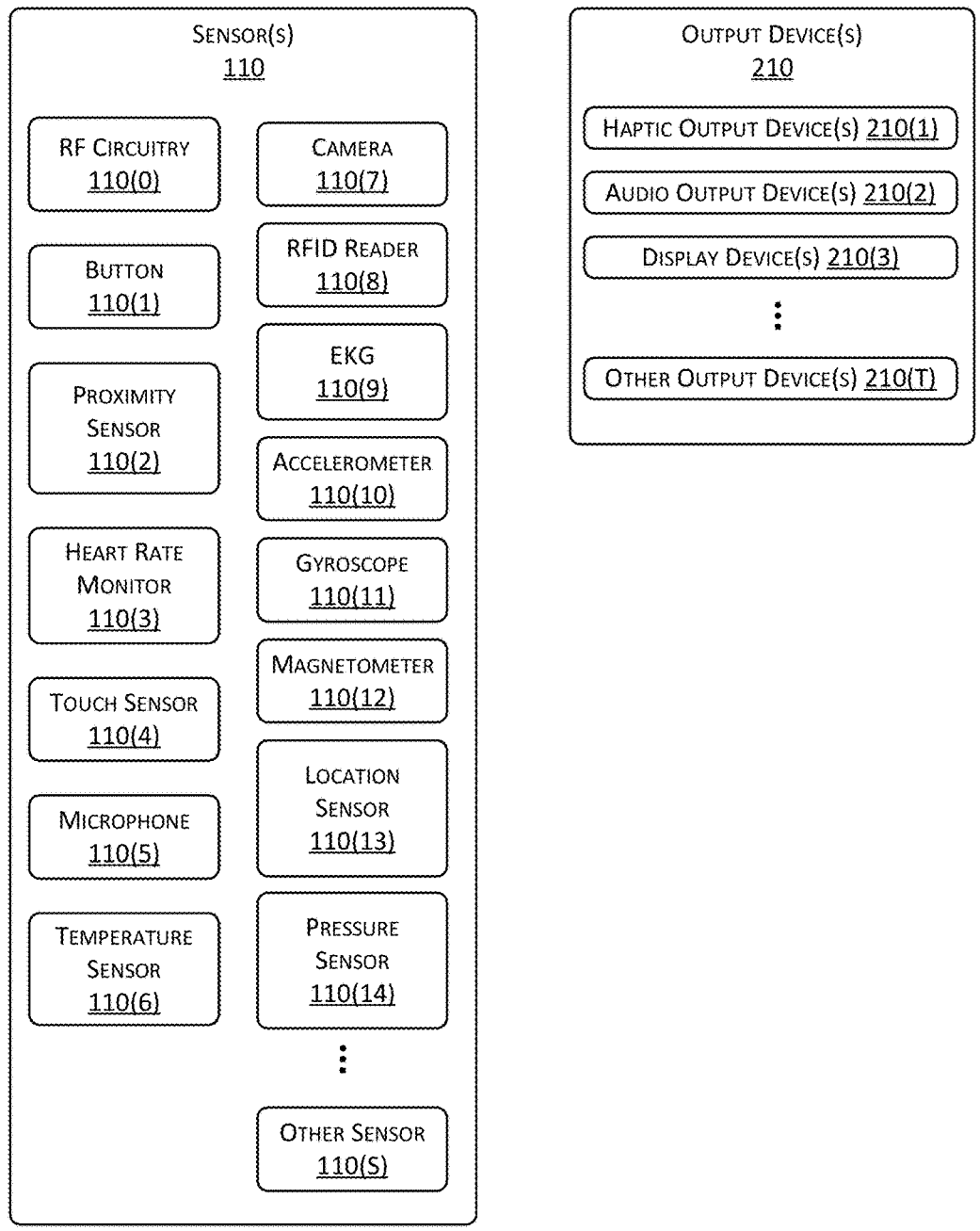
FIG. 2 illustrates a block diagram of sensors and output devices that may be used by the wearable device of the system during operation, according to one implementation.

FIG. 2 illustrates a block diagram 200 of sensors 110 and output devices 210 that may be used by the wearable device 104 of the system 100 during operation, according to one implementation.

The wearable device 104 may include one or more sensors 110 integrated with or internal to the wearable device 104. For example, the sensors 110 may be built-in to the wearable device 104 during manufacture. The wearable device 104 may also include output devices 210 to communicate with devices external to, but in communication with, the wearable device 104 using Bluetooth, Wi-Fi, 4G, 5G, LTE, ZigBee, Z-Wave, or another wireless or wired communication technology.

The one or more sensors 110 may include one or more buttons 110(1) that are configured to accept input from the user 102. The buttons 110(1) may comprise mechanical, capacitive, optical, or other mechanisms. For example, the buttons 110(1) may comprise mechanical switches configured to accept an applied force from a touch of the user 102 to generate an input signal.

A proximity sensor 110(2) may be configured to provide sensor data 324 indicative of one or more of a presence or absence of an object, a distance to the object, or characteristics of the object. The proximity sensor 110(2) may use optical, electrical, ultrasonic, electromagnetic, or other techniques to determine a presence of an object. For example, the proximity sensor 110(2) may comprise a capacitive proximity sensor configured to provide an electrical field and determine a change in electrical capacitance due to presence or absence of an object within the electrical field.

The sensors 110 may include RF circuitry 110(0).

The sensors 110 may include one or more touch sensors 110(4). The touch sensors 110(4) may use resistive, capacitive, surface capacitance, projected capacitance, mutual capacitance, optical, Interpolating Force-Sensitive Resistance (IFSR), or other mechanisms to determine the position of a touch or near-touch of the user 102. For example, the IFSR may comprise a material configured to change electrical resistance responsive to an applied force. The location within the material of that change in electrical resistance may indicate the position of the touch.

The sensors 110 may include one or more microphones 110(5) that may be configured to acquire information about sound present in the environment. In some implementations, arrays of microphones 110(5) may be used. These arrays may implement beamforming techniques to provide for directionality of gain. The one or more microphones 110(5) may be used to acquire audio data, such as speech from the user 102.

A temperature sensor (or thermometer) 110(6) may provide information indicative of a temperature of an object. The temperature sensor 110(6) in may be configured to measure ambient air temperature proximate to the user 102, the body temperature of the user 102, and so forth. The temperature sensor 110(6) may comprise a silicon bandgap temperature sensor, thermistor, thermocouple, or other device. In some implementations, the temperature sensor 110(6) may comprise an infrared detector configured to determine temperature using thermal radiation.

The sensors 110 may include one or more cameras 110(7). The cameras 110(7) may comprise a charge couple device, complementary metal oxide semiconductor, or other image sensor that is able to acquire images.

The sensors 110 may include one or more radio frequency identification (RFID) readers 110(8), near field communication (NFC) systems, and so forth. The user 102, objects around the wearable device 104, locations within a building, and so forth, may be equipped with one or more radio frequency (RF) tags. The RF tags are configured to emit an RF signal. In one implementation, the RF tag may be an RFID tag configured to emit the RF signal upon activation by an external signal. For example, the external signal may comprise an RF signal or a magnetic field configured to energize or activate the RFID tag. In another implementation, the RF tag may comprise a transmitter and a power source configured to power the transmitter. For example, the RF tag may comprise a Bluetooth Low Energy (BLE) transmitter and battery. In other implementations, the tag may use other techniques to indicate its presence. For example, an acoustic tag may be configured to generate an ultrasonic signal, which is detected by corresponding acoustic receivers. In yet another implementation, the tag may be configured to emit an optical signal.

The sensors 110 may include an electrocardiograph (EKG) 110(9) that is configured to detect electrical signals produced by the heart of the user 102.

The sensors 110 may include one or more accelerometers 110(10). The accelerometers 110(10) may provide information such as the direction and magnitude of an imposed acceleration. Data such as rate of acceleration, determination of changes in direction, speed, and so forth, may be determined using the accelerometers 110(10).

The sensors 110 may include a gyroscope 110(11). The gyroscope 110(11) provides information indicative of rotation of an object affixed thereto. For example, the gyroscope 110(11) may indicate whether the device has been rotated.

The sensors 110 may include a magnetometer 110(12). The magnetometer 110(12) may be used to determine an orientation by measuring ambient magnetic fields, such as the terrestrial magnetic field. For example, output from the magnetometer 110(12) may be used to determine whether the wearable device 104 comprising the sensor 110 has changed orientation or otherwise moved. In other implementations, the magnetometer 110(12) may be configured to detect magnetic fields generated by another device.

The sensors 110 may include a location sensor 110(13). The location sensor 110(13) is configured to provide information indicative of a location. The location may be relative or absolute. For example, a relative location may indicate "kitchen", "bedroom", "conference room", and so forth. In comparison, an absolute location is expressed relative to a reference point or datum, such as a street address, geolocation comprising coordinates indicative of latitude and longitude, grid square, and so forth. The location sensor 110(13) may include, but is not limited to, radio navigation-based systems such as terrestrial or satellite-based navigational systems. The satellite-based navigation system may include one or more of a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth. In some implementations, the location sensor 110(13) may be omitted or operate in conjunction with an external resource such as a cellular network operator providing location information, or Bluetooth beacons.

The sensors 110 may include a pressure sensor 110(14). The pressure sensor 110(14) may provide information about the pressure between a portion of the wearable device 104 and a portion of the user 102. For example, the pressure sensor 110(14) may comprise a capacitive element, strain gauge, spring-biased contact switch, or other device that is used to determine the amount of pressure between the user's 102 arm and an inner surface of the wearable device 104 that is in contact with the arm. In some implementations the pressure sensor 110(14) may provide information indicative of a force measurement, such as 0.5 Newtons, a relative force measurement, or whether the pressure is greater than a threshold value.

In some implementations, operation of one or more components in the wearable device 104 may be based at least in part on information from the pressure sensor 110(14). For example, based on data provided by the pressure sensor 110(14) a determination may be made as to whether at least a portion of the wearable device 104 is in contact with the user 102 or another object. Continuing the example, if the pressure indicated by the pressure sensor 110(14) exceeds a threshold value, the wearable device 104 may be determined to be in contact with the user 102. Based on this determination that the wearable device 104 is in contact with the user 102, one or more of a transmitter, receiver, sensors 110, PPG module, optical sensor, and so forth may be operated. Likewise, data from the pressure sensor 110(14) may be used to determine the wearable device 104 is not in sufficient physical contact with the user 102. As a result, one or more of the transmitter, receiver, sensors 110, PPG module, or optical sensor, and so forth may be turned off.

The sensors 110 may include other sensors 110(S) as well. For example, the other sensors 110(S) may include strain gauges, anti-tamper indicators, and so forth. For example, strain gauges or strain sensors may be embedded within the wearable device 104 and may be configured to provide information indicating that at least a portion of the wearable device 104 has been stretched or displaced such that the wearable device 104 may have been donned or doffed.

In some implementations, the sensors 110 may include hardware processors, memory, and other elements configured to perform various functions. Furthermore, the sensors 110 may be configured to communicate by way of a network or may couple directly with a computing device.

The computing device may include one or more output devices 210. The output devices 210 are configured to generate signals which may be perceived by the user 102, detectable by the sensors 110, or a combination thereof.

Haptic output devices 210(1) are configured to provide a signal, which results in a tactile sensation to the user 102. The haptic output devices 210(1) may use one or more mechanisms such as electrical stimulation or mechanical displacement to provide the signal. For example, the haptic output devices 210(1) may be configured to generate a modulated electrical signal, which produces an apparent tactile sensation in one or more fingers of the user 102. In another example, the haptic output devices 210(1) may comprise piezoelectric or rotary motor devices configured to provide a vibration that may be felt by the user 102.

One or more audio output devices 210(2) are configured to provide acoustic output. The acoustic output includes one or more of infrasonic sound, audible sound, or ultrasonic sound. The audio output devices 210(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output by an audio output device 210(2).

The display devices 210(3) may be configured to provide output that may be seen by the user 102 or detected by a light-sensitive detector such as an image sensor or light sensor. The output may be monochrome or color. The display devices 210(3) may be emissive, reflective, or both. An emissive display device 210(3), such as using light emitting diodes (LEDs), is configured to emit light during operation. In comparison, a reflective display device 210(3), such as using an electrophoretic element, relies on ambient light to present an image. Backlights or front lights may be used to illuminate non-emissive display devices 210(3) to provide visibility of the output in conditions where the ambient light levels are low.

The display mechanisms of display devices 210(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, LED displays, and so forth. These display mechanisms are configured to emit light, modulate incident light emitted from another source, or both. The display devices 210(3) may operate as panels, projectors, and so forth.

The display devices 210(3) may be configured to present images. For example, the display devices 210(3) may comprise a pixel-addressable display. The image may comprise at least a two-dimensional array of pixels or a vector representation of a two-dimensional image.

In some implementations, the display devices 210(3) may be configured to provide non-image data, such as text or numeric characters, colors, and so forth. For example, a segmented electrophoretic display device, segmented LED, and so forth, may be used to present information such as letters or numbers. The display devices 210(3) may also be configurable to vary the color of the segment, such as using multicolor LED segments.

Other output devices 210(T) may also be present. For example, the other output devices 210(T) may include scent or odor dispensers.

Figure 3:
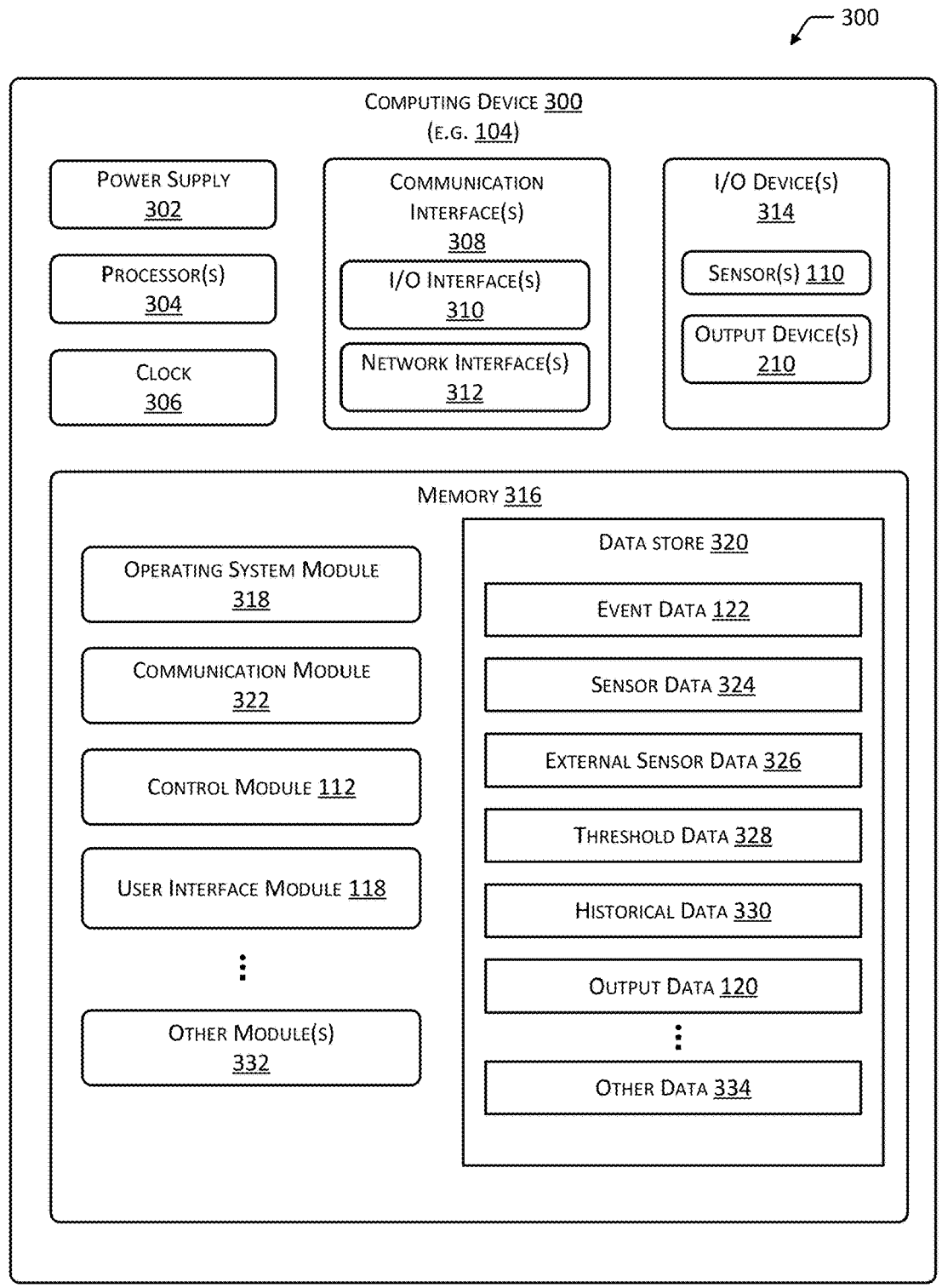
FIG. 3 illustrates a block diagram of a computing device configured to support operation of a wearable device, according to one implementation.

FIG. 3 illustrates a block diagram of a computing device 300 configured to support operation of a wearable device 104, according to one implementation. The computing device 300 may be the wearable device 104.

One or more power supplies 302 are configured to provide electrical power suitable for operating the components in the computing device 300. In some implementations, the power supply 302 may comprise a rechargeable battery, fuel cell, photovoltaic cell, power conditioning circuitry, and so forth.

The computing device 300 may include one or more hardware processors 304 configured to execute one or more stored instructions. The processors 304 may comprise one or more cores. One or more clocks 306 may provide information indicative of date, time, ticks, and so forth. For example, the processor 304 may use data from the clock 306 to generate a timestamp, trigger a preprogrammed action, and so forth.

The computing device 300 may include one or more communication interfaces 308 such as input/output (I/O) interfaces 310, network interfaces 312, and so forth. The communication interfaces 308 enable the computing device 300, or components thereof, to communicate with other devices or components. The communication interfaces 308 may include one or more I/O interfaces 310. The I/O interfaces 310 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a camera 110(7), sensors 110, keyboard, mouse, scanner, and so forth. The I/O devices 314 may also include output devices 210 such as one or more of a display device 210(3), printer, audio output device 210(2), and so forth. In some embodiments, the I/O devices 314 may be physically incorporated with the computing device 300 or may be externally placed.

The network interfaces 312 are configured to provide communications between the computing device 300 and other devices, such as the sensors 110, routers, access points, and so forth. The network interfaces 312 may include devices configured to couple to wired or wireless personal area networks (PANS), local area networks (LANs), wide area networks (WANs), and so forth. For example, the network interfaces 312 may include devices compatible with Ethernet, Wi-Fi, Bluetooth, ZigBee, 4G, 5G, LTE, and so forth.

The computing device 300 may also include one or more buses or other internal communications hardware or software that allow for the transfer of data between the various modules and components of the computing device 300.

The computing device 300 also includes one or more memories 316. The memory 316 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the computing device 300. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the network interfaces 312, the I/O devices 314, and provide various services to applications or modules executing on the processors 304. The OS module 318 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; the Android operating system from Google Corporation of Mountain View, Calif., USA; the iOS operating system from Apple Corporation of Cupertino, Calif., USA; or other operating systems.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the computing devices 300, network attached storage devices, and so forth. The data store 320 may store sensor data 324, event data 122, output data 120, or other data 334.

A communication module 322 may be configured to establish communications with one or more of other computing devices 300, the sensors 110, or other devices. The communications may be authenticated, encrypted, and so forth. The communication module 322 may also control the communication interfaces 308.

The memory 316 may also store the control module 112. As described above, the control module 112 may operate a sensor assembly. In other examples, the control module 112 may be implemented by electronic circuitry comprising one or more electronic components.

The memory 316 may store the control module 112. The control module 112 uses the sensor data 324 as input to generate the biomedical data.

Threshold data 328 may be stored in the memory 316. For example, the threshold data 328 may specify threshold values for one or more of: a rate of change threshold, habitable altitude threshold, user event pressure threshold, and so forth. The rate of change thresholds may be used to determine whether the rate of change in air pressure detected by a pressure sensor 108 is a change in altitude or a user input event. The event pressure threshold may be used for comparing a single pressure measurement to determine whether an air pressure measurement is a user input event without regard to a rate of change in air pressure.

The user interface module 118 provides a user interface using one or more of the I/O devices 314. The user interface module 118 may be used to obtain input from the user 102, present information to the user 102, and so forth. For example, the user interface module 118 may present a graphical user interface on the display device 210(3) and accept user input using the touch sensor 110(4).

The computing device 300 may maintain historical data 330. For example, the historical data 330 may comprise the biomedical data, or data from one or more of the sensors 110 obtained at different times. The historical data 330 may be used to provide information about trends or changes over time. For example, the historical data 330 may comprise an indication of average daily heart rate or blood oxygenation levels of the user 102 over a span of several weeks. The user 102 may then use this data to assist in managing a fitness regimen or adjust behaviors toward a healthy lifestyle.

Other modules 332 may also be present in the memory 316, as well as other data 334 in the data store 320.

In different implementations, different computing devices 300 may have different capabilities or capacities. In one implementation, the wearable device 104 may determine the biomedical data and send the biomedical data to other devices. Other combinations of distribution of data processing and functionality may be used in other implementations.

Figure 4:
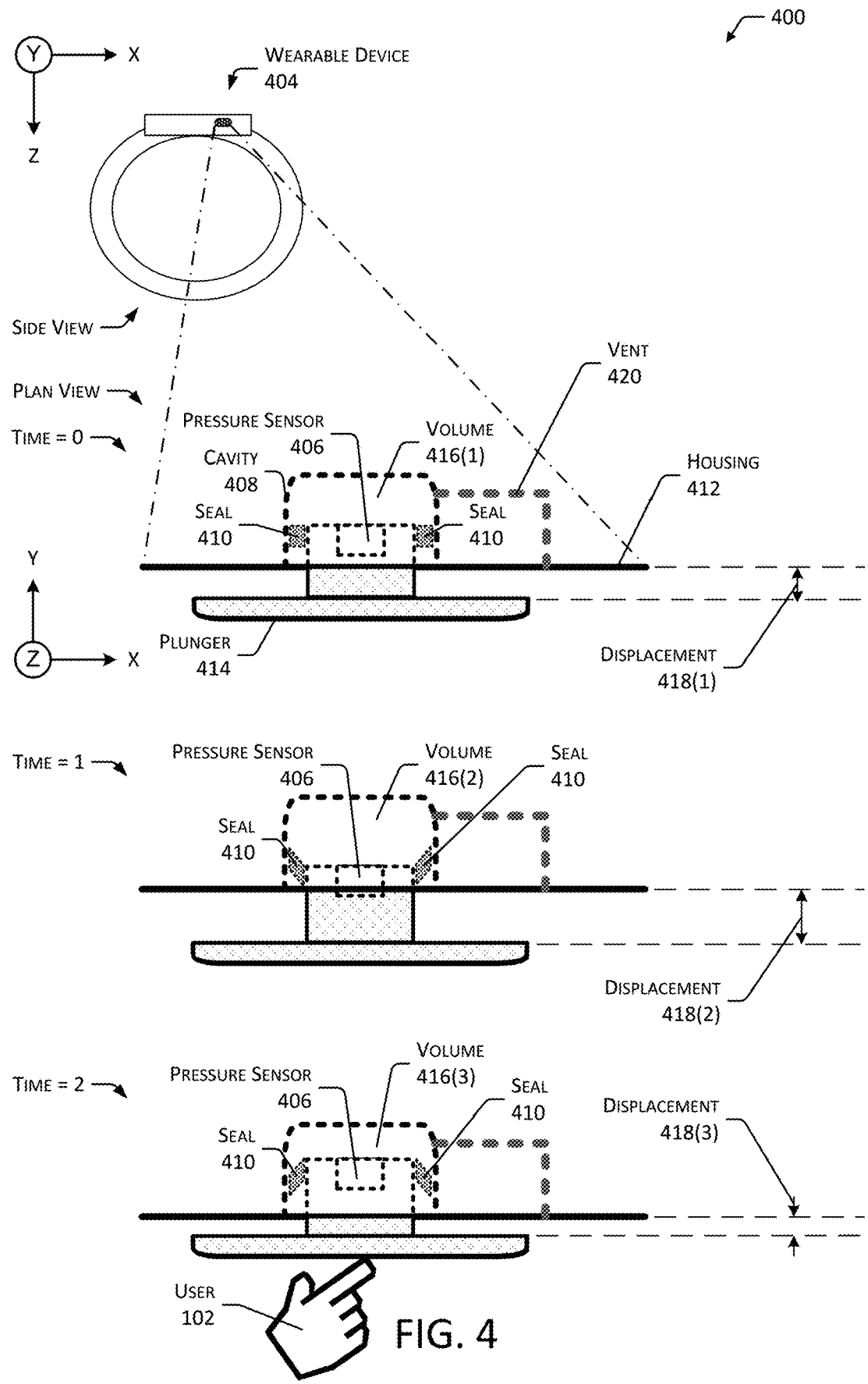
FIG. 4 illustrates a wearable device that uses a pressure sensor to determine a user input event, according to one implementation.

FIG. 4 illustrates, at 400, one implementation of a wearable device 404 that uses a pressure sensor 406 to determine a user input event.

In this example, the wearable device 404 includes a sensor assembly, where the sensor assembly includes one or more of: a cavity 408, a seal 410, a plunger 414, or a pressure sensor 406. The wearable device 404 may be implemented similarly to the wearable device 104 described with respect to FIG. 1. However, the sensor assembly described with respect to FIG. 1 is implemented differently from the sensor assembly in FIG. 4. In other examples, a portable device may implement the sensor assembly comprising one or more of: the cavity 408, the seal 410, the plunger 414, or the pressure sensor 406.

In this example, a vent 420 or passageway may be used to equalize air pressure within the cavity 408 to match the air pressure of an ambient environment. With respect to the cavity 408, an outlet of the passageway is the ambient environment. The vent 420 or passageway may equalize pressure over a period of time greater than a period of time used to determine a user input event or a change in altitude. Because air pressure of a volume of air is not equalized within a period of time used to determine a user input event, pressure measurements within the period of time continue to indicate whether rates of change in air pressure are indicative of a user input event.

In this example, at a first time, time=0, the pressure of a first volume 416(1) of air may be equalized with the pressure of a first ambient environment of the wearable device 404. At the first time, the wearable device 404 may be at a first altitude. At the first time, the plunger 414 is at a first distance between a surface of the plunger 414 and the housing 412. The first distance is depicted as displacement 418(1). At the first time, the seal 410 is not distended or stretched due to either air pressure from the first volume 416(1) of air or from air pressure from the first ambient environment. At the first time, the air pressure of the first ambient environment at the first altitude is approximately equal to the air pressure of the first volume 416(1) of air. The seal 410 may be between a perimeter of the plunger 414 and one or more sides of the cavity 408, where the first volume 416(1) of air is bounded by one or more portions of: the plunger 414, the seal 410, and the cavity 408.

At a second time, time=1, the control module 112 may determine a first plurality of measurements from the pressure sensor 406 over a first time period. The first plurality of measurements may indicate or be used to determine first one or more pressure values over the first time period. At the second time, the plunger 414 is at a second distance between the surface of the plunger 414 and the housing 412. The second distance is depicted as displacement 418(2). At the second time, the seal 410 is, relative to the first time, stretched outward in a direction away from the housing 412.

At the second time, the seal 410 may be distended or stretched because air pressure within a second volume 416(2) of air being greater than air pressure of a second ambient environment. The pressure differential between the second volume 416(2) of air and the second ambient environment causes the plunger 414 to move outward to equalize the pressure between the second volume 416(2) of air and the second ambient environment. In this example, air pressure of the second volume 416(2) of air may be greater than air pressure of the second ambient environment as a result of the user moving from the first altitude to a second altitude, where the second altitude is higher than the first altitude.

At the second time, the first one or more pressure values may be indicative of pressure data of the second volume 416(2) of air over the first time period. The first time period may be a period of time between the first time and the second time. The control module 112 may determine a first rate of change using the first one or more pressure values over the first time period. For example, with respect to the first one or more pressure values, a first pressure value may indicate 1013.25 millibars (mbar) and a second pressure value may indicate 1013.18 millibars. A difference between the first pressure value and the second pressure value equal to 0.07 mbar may be associated with a change in altitude of 0.5 meters (m). If the first time period is 1 second (sec), then the first rate of change in air pressure is 0.07 mbar/sec.

At the second time, based on the first rate of change being below a first threshold rate of change, the control module 112 may determine that the first plurality of measurements is indicative of a second altitude. In this example, the first threshold rate of change in air pressure may be 2.5 mbar/sec. The control module 112 may determine, based on the first one or more pressure values, that the second altitude is 0.5 m, or 0.5 meters above the first altitude. The control module 112 may save a first value indicating the second altitude as event data 122, where the event data 122 may be used to update an application or user interface element displayed by the wearable device 404.

At a third time, time=2, the control module 112 may determine a second plurality of measurements from the pressure sensor 406 over a second time period. The second plurality of measurements may indicate or be used to determine second one or more pressure values over the second time period. At the third time, the plunger 414 is at a third distance between the surface of the plunger 414 and the housing 412. The third distance is depicted as displacement 418(3). At the third time, the seal 410 is, relative to the first time, stretched inward in a direction from the plunger 414 toward the pressure sensor 406.

At the third time, the seal 410 may be distended or stretched because of force applied to the plunger 414. For example, a user 102 may press the plunger 414 and apply a force. The applied force to the plunger 414 may move the plunger 414 inward, causing the second volume 416(2) of air to be compressed, resulting in a third volume 416(3) of air. Because a same quantity of air enclosed by the cavity 408, seal 410, and plunger 414 is held in a smaller volume, the air pressure of the third volume 416(3) is greater than the air pressure of the second volume 416(2) of air.

At the third time, the second one or more pressure values may be indicative of pressure data of the third volume 416(3) of air over the second time period. The second time period may be a period of time between the second time and the third time. The control module 112 may determine a second rate of change using the second one or more pressure values over the second time period. For example, with respect to the second one or more pressure values, a first pressure value may indicate 1013.18 millibars and a second pressure value may indicate 1025.32 millibars. A difference between the first pressure value and the second pressure value equal to 12.14 may be associated with a decrease in altitude of about 100.0 meters (m). If the second time period is 1 seconds (sec), then the second rate of change in air pressure is 12.14 mbar/sec.

At the third time, based on the second rate of change being greater than the threshold rate of change, the control module 112 may determine that the second plurality of measurements is indicative of a user input event. As described above, in this example, the threshold rate of change in air pressure may be 2.5 mbar/sec. The control module 112 may save a second value indicating the user input event as event data 122, where the event data 122 may be used to update an operating system, an application, or user interface element displayed by the wearable device 404. In this example, after the user 102 removes pressure from the plunger 414, the plunger 414 may return to being at the first distance from the housing 412.

Figure 5:
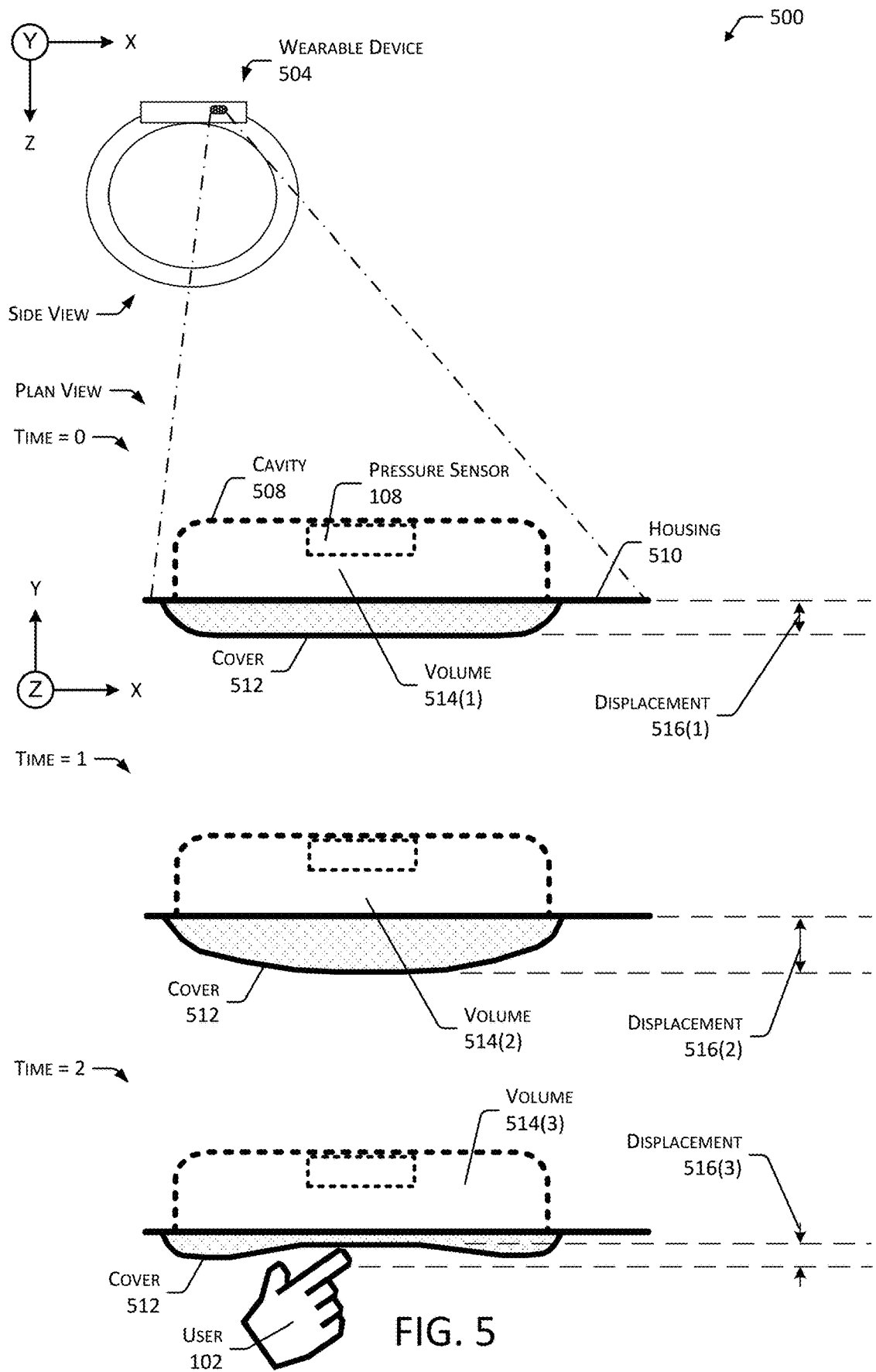
FIG. 5 illustrates a wearable device that uses a pressure sensor to determine a user input event, according to one implementation.

FIG. 5 illustrates, at 500, one implementation of a wearable device 504 that uses a pressure sensor 108 to determine a user input event.

In this example, the wearable device 504 includes a sensor assembly, where the sensor assembly includes one or more of: a cavity 508, a cover 512, or a pressure sensor 108. The wearable device 504 may be implemented similarly to the wearable device 104 described with respect to FIG. 1. However, the sensor assembly described with respect to FIG. 1 is implemented differently from the sensor assembly in FIG. 5. In other examples, a portable device may implement the sensor assembly comprising one or more of: the cavity 508, the cover 512, or the pressure sensor 108.

In this example, at a first time, time=0, the pressure of a first volume 514(1) of air may be equalized with the pressure of a first ambient environment of the wearable device 504. At the first time, the wearable device 504 may be at a first altitude. At the first time, the cover 512 is at a first distance between at least a portion of the surface of the cover 512 and the housing 510. The first distance is depicted as displacement 516(1).

The cover 512 may be made of a flexible or elastic material, such as elastomeric material. The cover 512 may be an overmolding and may be overmolded onto the housing 510. The cover 512 may be impermeable to air or permeable to air. If the cover 512 is permeable to air, then the cover 512 permits movement of air between at least a portion of the cavity 508 and an ambient environment. If the cover 512 is impermeable to air, then the cover 512 does not permit movement of air between the cavity 508 and an ambient environment.

Continuing this example, at the first time, the air pressure of the first ambient environment at the first altitude is equal, within a specified threshold, to the air pressure of the first volume 514(1) of air. In this example, the first volume 514(1) of air is bounded by the cover 512 and the cavity 508.

At a second time, time=1, the control module 112 may determine a first plurality of measurements from the pressure sensor 108 over a first time period. The first plurality of measurements may indicate or be used to determine first one or more pressure values over the first time period. At the second time, the cover 512 is at a second distance between at least a portion of the surface of the cover 512 and the housing 510. The second distance is depicted as displacement 516(2). At the second time, one or more portions of the cover 512 may be distended or stretched because of the pressure differential between the second volume 514(2) of air and the second ambient environment.

At the second time, the pressure differential between the second volume 514(2) of air and the second ambient environment causes at least a portion of the cover 512 to move outward to equalize the pressure between the second volume 514(2) of air and the second ambient environment. In this example, air pressure of the second volume 514(2) of air may be greater than air pressure of the second ambient environment as a result of the user moving from the first altitude to a second altitude, where the second altitude is higher than the first altitude.

At the second time, the first one or more pressure values may be indicative of pressure data of the second volume 514(2) of air over the first time period. The first time period may be a period of time between the first time and the second time. The control module 112 may determine a first rate of change using the first one or more pressure values over the first time period. For example, with respect to the first one or more pressure values, a first pressure value may indicate 1013.25 millibars (mbar) and a second pressure value may indicate 1013.18 millibars. A difference between the first pressure value and the second pressure value equal to 0.07 mbar may be associated with a change in altitude of 0.5 meters (m). If the first time period is 1 second (sec), then the first rate of change in air pressure is 0.07 mbar/sec.

At the second time, based on the first rate of change being below a first threshold rate of change, the control module 112 may determine that the first plurality of measurements is indicative of a second altitude. In this example, the first threshold rate of change in air pressure may be 2.5 mbar/sec. The control module 112 may determine, based on the first one or more pressure values, that the second altitude is 0.5 m, or 0.5 meters above the first altitude. The control module 112 may save a first value indicating the second altitude as event data 122, where the event data 122 may be used to update an application or user interface element displayed by the wearable device 504.

At a third time, time=2, the control module 112 may determine a second plurality of measurements from the pressure sensor 108 over a second time period. The second plurality of measurements may indicate or be used to determine second one or more pressure values over the second time period. At the third time, the cover 512 is at a third distance between at least a portion of the surface of the cover 512 and the housing 510. The third distance is depicted as displacement 516(3).

At the third time, the cover 512 may be distended or stretched because of force applied to the cover 512 by the user 102. For example, a user 102 may press the cover 512 and apply a force. The applied force to the cover 512 may stretch at least a portion of the cover 512 inward, causing the second volume 514(2) of air to be compressed, resulting in a third volume 514(3) of air. Because a same quantity of air enclosed by the cavity 508 and the cover 512 is held in a smaller volume, the air pressure of the third volume 514(3) is greater than the second volume 514(2) of air.

At the third time, the second one or more pressure values may be indicative of pressure data of the third volume 514(3) of air over the second time period. The second time period may be a period of time between the second time and the third time. The control module 112 may determine a second rate of change using the second one or more pressure values over the second time period. For example, with respect to the second one or more pressure values, a first pressure value may indicate 1013.18 millibars and a second pressure value may indicate 1025.32 millibars. A difference between the first pressure value and the second pressure value equal to 12.14 may be associated with a decrease in altitude of about 100.0 meters (m). If the second time period is 1 seconds (sec), then the second rate of change in air pressure is 12.14 mbar/sec.

At the third time, based on the second rate of change being greater than the threshold rate of change, the control module 112 may determine that the second plurality of measurements is indicative of a user input event. As described above, in this example, the threshold rate of change in air pressure may be 2.5 mbar/sec. The control module 112 may save a second value indicating the user input event as event data 122, where the event data 122 may be used to update an operating system, an application, or user interface element displayed by the wearable device 504. In this example, after the user 102 removes pressure from the cover 512, the cover 512 may return to the first distance from the housing 510.

Figure 6:
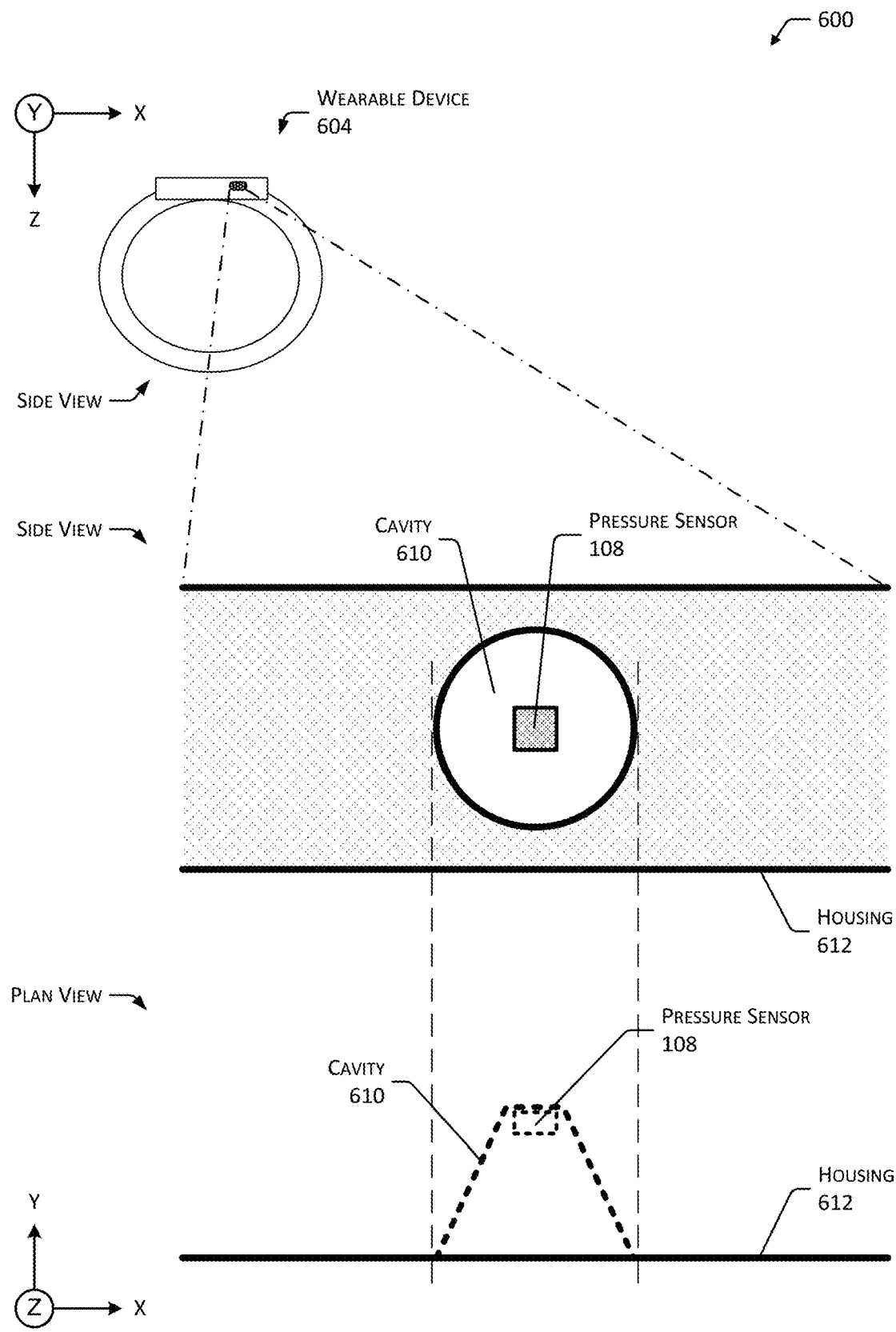
FIG. 6 illustrates a wearable device that uses a pressure sensor to determine a user input event, according to one implementation.

FIG. 6 illustrates, at 600, one implementation of a wearable device 604 that uses a pressure sensor 108 to determine a user input event.

In this example, the wearable device 604 includes a sensor assembly, where the sensor assembly includes a cavity 610 and a pressure sensor 108. The wearable device 604 may be implemented similarly to the wearable device 104 described with respect to FIG. 1. However, the sensor assembly described with respect to FIG. 1 is implemented differently from the sensor assembly in FIG. 6. In this example, there is no cover over the cavity 610, and the cavity 610 is exposed to an ambient environment. In other examples, a portable device may implement the sensor assembly comprising the cavity 610 and the pressure sensor 108.

In this example, at a first time, the wearable device 604 may be at a first altitude. At the first time, the air pressure of the first ambient environment at the first altitude may be measured by the pressure sensor 108. The air pressure at the first time may be used to determine the first altitude.

At a second time, the control module 112 may determine a first plurality of measurements from the pressure sensor 108 over a first time period. The first plurality of measurements may indicate or be used to determine first one or more pressure values over the first time period. At the second time, the first one or more pressure values may be indicative of pressure data of the ambient environment over the first time period. The first time period may be a period of time between the first time and the second time.

The control module 112 may determine a first rate of change using the first one or more pressure values over the first time period. For example, with respect to the first one or more pressure values, a first pressure value may indicate 1013.25 millibars (mbar) and a second pressure value may indicate 1013.18 millibars. A difference between the first pressure value and the second pressure value equal to 0.07 mbar may be associated with a change in altitude of 0.5 meters (m). If the first time period is 1 second (sec), then the first rate of change in air pressure is 0.07 mbar/sec.

At the second time, based on the first rate of change being below a first threshold rate of change, the control module 112 may determine that the first plurality of measurements is indicative of a second altitude. In this example, the first threshold rate of change in air pressure may be 2.5 mbar/sec. The control module 112 may determine, based on the first one or more pressure values, that the second altitude is 0.5 m, or 0.5 meters above the first altitude. The control module 112 may save a first value indicating the second altitude as event data 122, where the event data 122 may be used to update an application or user interface element displayed by the wearable device 604.

At a third time, time=2, the control module 112 may determine a second plurality of measurements from the pressure sensor 108 over a second time period. The second plurality of measurements may indicate or be used to determine second one or more pressure values over the second time period. At the third time, the second one or more pressure values may be indicative of air pressure data over the second time period. The second time period may be a period of time between the second time and the third time.

In this example, a change in air pressure may result from a user 102 covering the cavity 610. For example, a user 102 may use a finger to cover and press over the cavity 610, where the user's finger may create a seal around a perimeter of the cavity along the housing 612. The seal resulting from the user's finger may create a temporary volume of air enclosed by the cavity 610 and the user's finger. The temporary volume of air may be compressed due to a pressing motion of the user's finger, where the pressing motion creates a change in air pressure within the temporary volume of air. The one or more pressure values may indicate one or more of the pressure values from a time before the user 102 created the temporary volume of air with a finger and the pressing motion of the user's finger. In this example, a user's finger is used to create a temporary volume of air, but in other examples a temporary volume of air may be created in other ways, such as a prosthetic device, a palm of a user's hand, or by using some other object.

The control module 112 may determine a second rate of change using the second one or more pressure values over the second time period. For example, with respect to the second one or more pressure values, a first pressure value may indicate 1013.18 millibars and a second pressure value may indicate 1025.32 millibars. A difference between the first pressure value and the second pressure value equal to 12.14 may be associated with a decrease in altitude of about 100.0 meters (m). If the second time period is 1 seconds (sec), then the second rate of change in air pressure is 12.14 mbar/sec.

At the third time, based on the second rate of change being greater than the threshold rate of change, the control module 112 may determine that the second plurality of measurements is indicative of a user input event. As described above, in this example, the threshold rate of change in air pressure may be 2.5 mbar/sec. The control module 112 may save a second value indicating the user input event as event data 122, where the event data 122 may be used to update an operating system, an application, or user interface element displayed by the wearable device 604.

Figure 7:
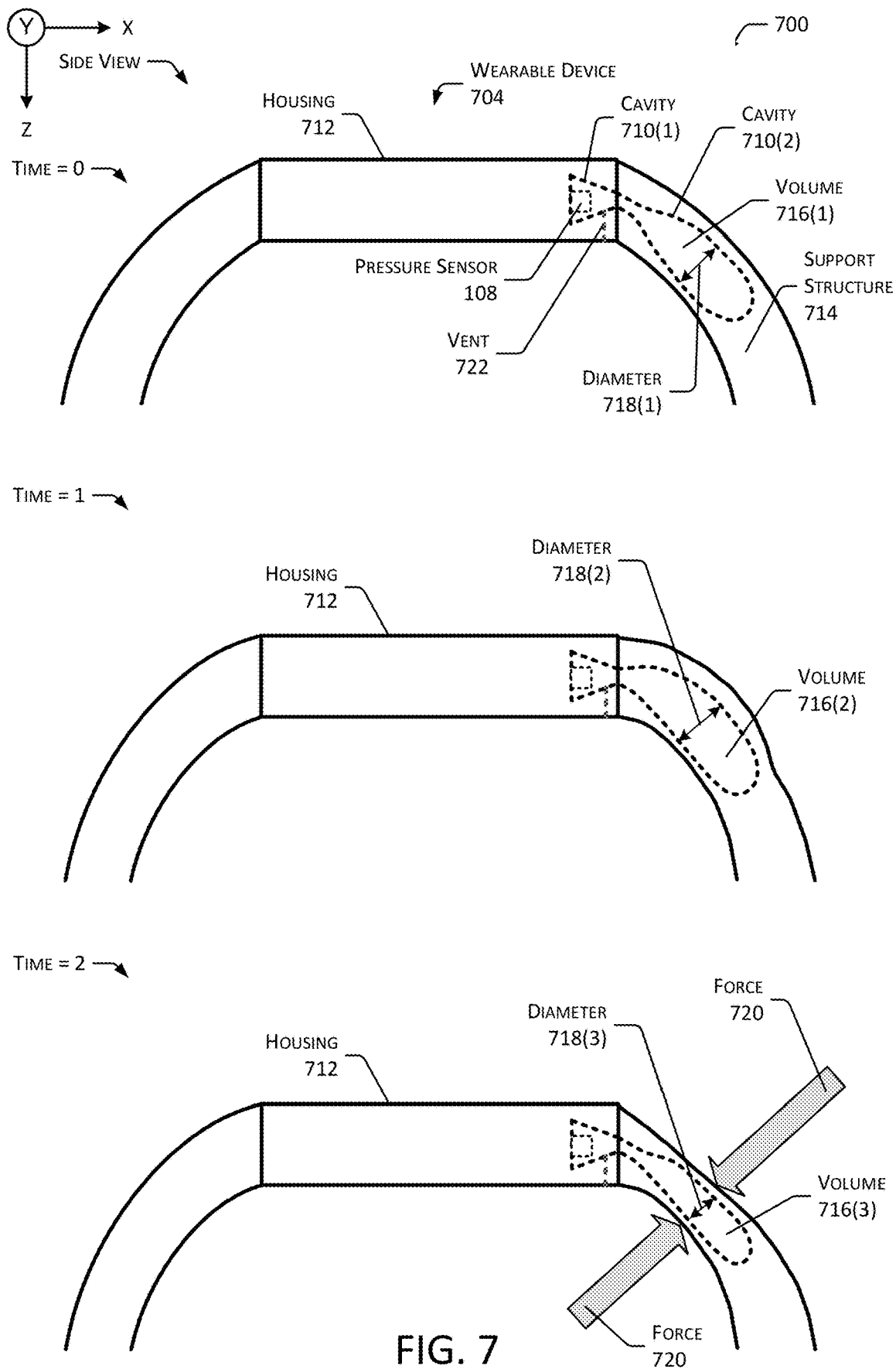
FIG. 7 illustrates a wearable device that uses a pressure sensor to determine a user input event, according to one implementation.

FIG. 7 illustrates, at 700, one implementation of a wearable device 704 that uses a pressure sensor 108 to determine a user input event.

In this example, the wearable device 704 includes a sensor assembly, where the sensor assembly includes one or more of: a first cavity 710(1), a second cavity 710(2), or a pressure sensor 108. The wearable device 704 may be implemented similarly to the wearable device 104 described with respect to FIG. 1. However, the sensor assembly described with respect to FIG. 1 is implemented differently from the sensor assembly in FIG. 7. In this example, a vent 722 or passageway may be used to equalize air pressure within the cavity 710 to match the air pressure of an ambient environment. With respect to the cavity 710, an outlet of the passageway is the ambient environment. The vent 722 or passageway may equalize pressure over a period of time greater than a period of time used to determine a user input event or a change in altitude. Because air pressure of a volume of air is not equalized within a period of time used to determine a user input event, pressure measurements within the period of time continue to indicate whether rates of change in air pressure are indicative of a user input event.

In this example, at a first time, time=0, the pressure of a first volume 716(1) of air may be equalized with the pressure of a first ambient environment of the wearable device 704. At the first time, the wearable device 704 may be at a first altitude. At the first time, the first volume 716(1) of air may be enclosed by a combined space from the cavity 710(1) within the housing 712 and from the cavity 710(2) within the support structure 714. In this example, the support structure 714 may attach to the housing 712, where the combined space is created by the support structure 714 attaching to the housing 712. Attaching the support structure 714 to the housing 712 may create a seal along a perimeter of the first cavity 710(1) and a perimeter of the second cavity 710(2). In this example, the support structure 714 may be made of elastomeric material, or some other type of flexible or elastic material.

Continuing this example, at the first time, the air pressure of the first ambient environment at the first altitude is equal, within a specified threshold, to the air pressure of the first volume 716(1) of air. In this example, the first volume 716(1) of air is bounded by the first cavity 710(1) and the second cavity 710(2). At the first time, the second cavity 710(2) may have a diameter 718(1). In this example, the diameter 718(1) is less than a diameter 718(2) and greater than a diameter 718(3).

At a second time, time=1, the control module 112 may determine a first plurality of measurements from the pressure sensor 108 over a first time period. The first plurality of measurements may indicate or be used to determine first one or more pressure values over the first time period. At the second time, the second cavity 710(2) may have the diameter 718(2). In this example, the diameter 718(2) is greater than the diameter 718(1) and greater than the diameter 718(3). At the second time, one or more portions of the support structure 714 enclosing the second cavity 710(2) may be distended or stretched because of the pressure differential between the second volume 716(2) of air and the second ambient environment.

At the second time, the pressure differential between the second volume 716(2) of air and the second ambient environment causes at least a portion of the support structure 714 to stretch to equalize the pressure between the second volume 716(2) of air and the second ambient environment. In this example, air pressure of the second volume 716(2) of air may be greater than air pressure of the second ambient environment as a result of the user moving from the first altitude to a second altitude, where the second altitude is higher than the first altitude.

At the second time, the first one or more pressure values may be indicative of pressure data of the second volume 716(2) of air over the first time period. The first time period may be a period of time between the first time and the second time. The control module 112 may determine a first rate of change using the first one or more pressure values over the first time period. For example, with respect to the first one or more pressure values, a first pressure value may indicate 1013.25 millibars (mbar) and a second pressure value may indicate 1013.18 millibars. A difference between the first pressure value and the second pressure value equal to 0.07 mbar may be associated with a change in altitude of 0.5 meters (m). If the first time period is 1 second (sec), then the first rate of change in air pressure is 0.07 mbar/sec.

At the second time, based on the first rate of change being below a first threshold rate of change, the control module 112 may determine that the first plurality of measurements is indicative of a second altitude. In this example, the first threshold rate of change in air pressure may be 2.5 mbar/sec. The control module 112 may determine, based on the first one or more pressure values, that the second altitude is 0.5 m, or 0.5 meters above the first altitude. The control module 112 may save a first value indicating the second altitude as event data 122, where the event data 122 may be used to update an application or user interface element displayed by the wearable device 704.

At a third time, time=2, the control module 112 may determine a second plurality of measurements from the pressure sensor 108 over a second time period. The second plurality of measurements may indicate or be used to determine second one or more pressure values over the second time period.

At the third time, one or more portions of the support structure 714 enclosing the second cavity 710(2) may be distended or stretched because of a force 720 applied to the support structure 714. For example, a user 102 may press a portion of the support structure 714 enclosing the second cavity 710(2) and apply the force 720. The applied force 720 may compress at least a portion of the support structure 714, causing the second volume 716(2) of air to be compressed, resulting in a third volume 716(3) of air. Because a same quantity of air enclosed by the second volume 716(2) is held in a smaller volume 716(3), the air pressure of the third volume 716(3) of air is greater than the second volume 716(2) of air.

At the third time, the second one or more pressure values may be indicative of pressure data of the third volume 716(3) of air over the second time period. The second time period may be a period of time between the second time and the third time. The control module 112 may determine a second rate of change using the second one or more pressure values over the second time period. At the third time, the second cavity 710(2) may have the diameter 718(3). In this example, the diameter 718(3) is less than the diameter 718(1) and diameter 718(2). For example, with respect to the second one or more pressure values, a first pressure value may indicate 1013.18 millibars and a second pressure value may indicate 1025.32 millibars. A difference between the first pressure value and the second pressure value equal to 12.14 may be associated with a decrease in altitude of about 100.0 meters (m). If the second time period is 1 seconds (sec), then the second rate of change in air pressure is 12.14 mbar/sec.

At the third time, based on the second rate of change being greater than the threshold rate of change, the control module 112 may determine that the second plurality of measurements is indicative of a user input event. In this example, the first threshold rate of change in air pressure may be 2.5 mbar/sec. The control module 112 may save a second value indicating the user input event as event data 122, where the event data 122 may be used to update an operating system, an application, or user interface element displayed by the wearable device. In this example, after the user 102 removes pressure from the support structure 714, the support structure 714 may return to a state prior to the applied pressure.

Figure 8:
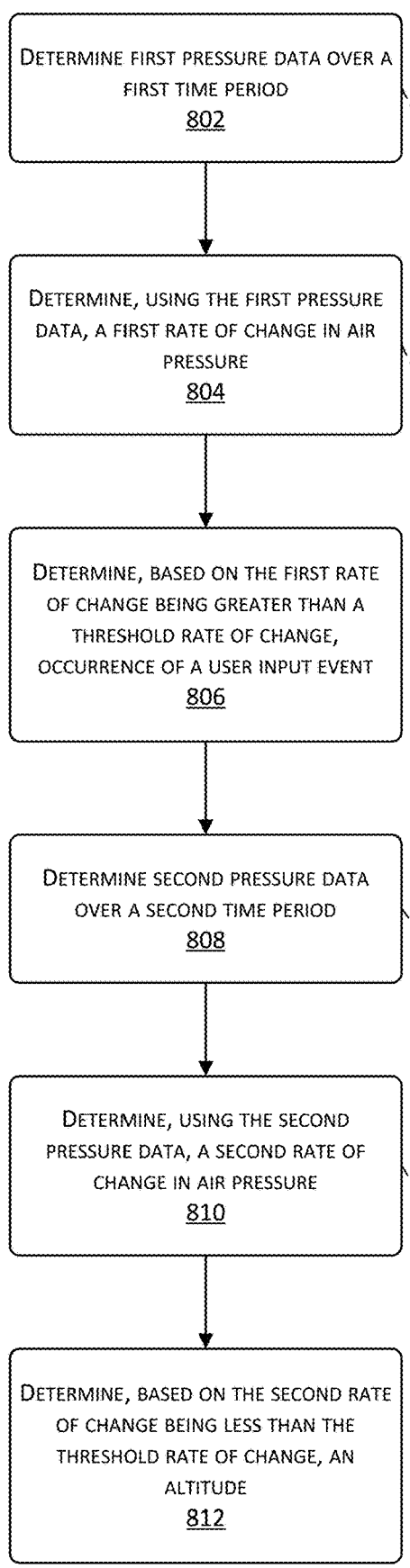
FIG. 8 illustrates a process of using a pressure sensor in a wearable device to determine a user input event, according to one implementation.
Figure 8:
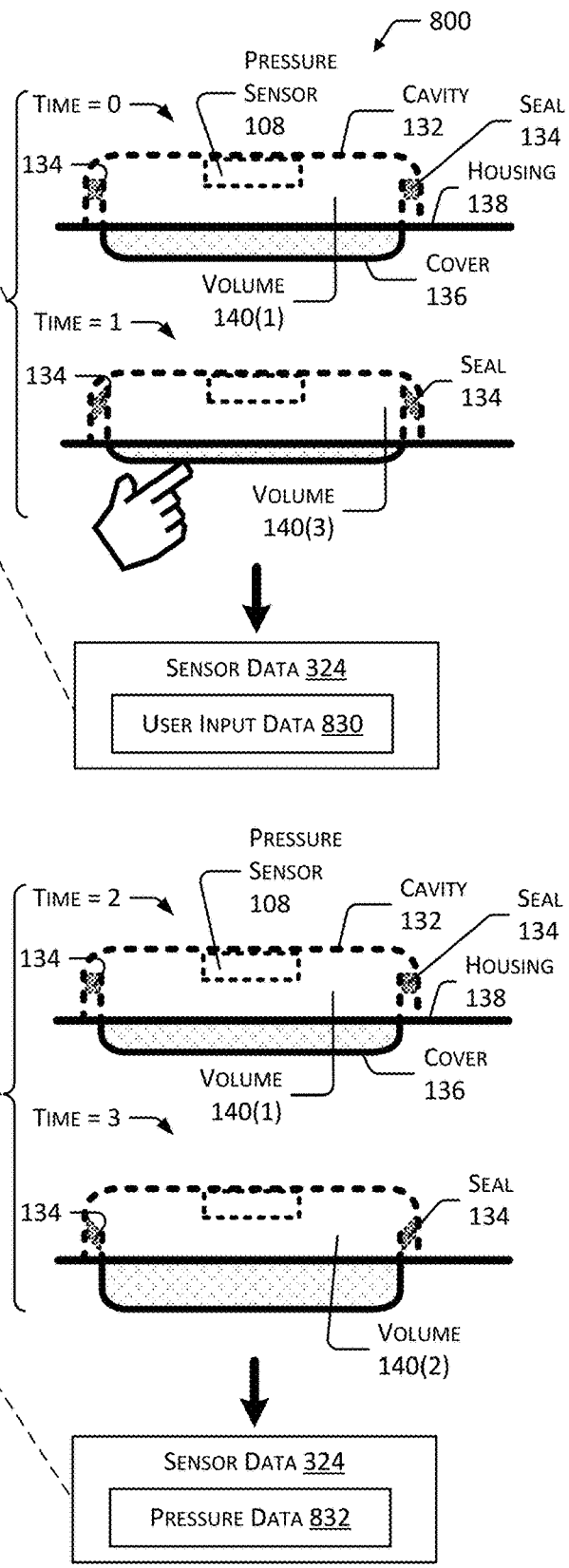

FIG. 8 illustrates a flow diagram 800 of a process of using a pressure sensor 108 in a wearable device to determine a user input event, according to one implementation. The process may be implemented by the wearable device 104.

At 802, the control module 112 may determine first pressure data over a first time period. For example, the first time period may be between a first time, time=0, and a second time, time=1. At the first time, the wearable device 104 may be at a first altitude. At the first time, air pressure of a first ambient environment at the first altitude is equal, within a specified threshold, to the air pressure of a first volume 140(1) of air. The control module 112 may determine the first pressure data comprising a first plurality of measurements from the pressure sensor 108 over the first time period. The pressure sensor 108 may be a barometric sensor. In some examples, a single measurement may comprise one or more readings of an output signal from imbalances in Wheatstone bridge piezoresistances, where the imbalance is due to a membrane being moved by air pressure. The air pressure may be the air pressure at different points in time of a volume of air enclosed by the cavity 132, the seal 134, and the cover 136. The first plurality of measurements may indicate or be used to determine first one or more pressure values over the first time period, including a first pressure value and a second pressure value. In this example, the first pressure value is $b_1$, and the second pressure value is $b_2$. In this example, the first time period may be 1 second. In other examples, the first time period may be shorter or longer.

At 804, the control module 112 may determine, using the first pressure data, a first rate of change in air pressure within the cavity 132. Using the first pressure data, the control module 112 may determine the first rate of change in air pressure to be $R_1=(|b_1-b_2|)/1.0$. In this example, $b_1=1013.25$, $b_2=1025.32$, and $R_1=12.07$ mbar/sec. In this example, an absolute value of the difference between the pressure values is used because the rate of change is used to determine a user input event, and not whether an altitude is higher or lower.

At 806, the control module 112 may determine, based on the first rate of change being greater than a threshold rate of change, occurrence of a user input event. For example, the threshold rate of change $R_T$ may be 2.5 mbar/sec, and because $R_1$ is greater than $R_T$, then the change in air pressure over the first time period as indicated by the first plurality of measurements is determined to be a result of a user input event. In this example, the user input event is interpreted to be a button press, where the button press may be an interactive response to a given application or operating system prompt or option operating on the wearable device 104. Information describing the user input event, such as a press-and-hold, a single press, a double press, or some other type of user input option, may be stored in user input data 830 within sensor data 324.

At 808, the control module 112 may determine second pressure data over a second time period. For example, the second time period may be between a third time, time=2, and a fourth time, time=3. At the third time, the wearable device 104 may be at a first altitude. The control module 112 may determine the second pressure data comprising a second plurality of measurements from the pressure sensor 108 over the second time period. The second plurality of measurements may indicate or be used to determine second one or more pressure values over the second time period, including a third pressure value and a fourth pressure value. In this example, the third pressure value is $b_3$, and the fourth pressure value is $b_4$. In this example, the second time period may be 1 second. In other examples, the first time period may be shorter or longer.

At 810, the control module 112 may determine, using the second pressure data, a second rate of change in air pressure within the cavity 132. Using the second pressure data, the control module 112 may determine the second rate of change in air pressure to be $R_2=(|b_3-b_4|)/1.0$. In this example, $b_3=1013.25$, $b_2=1013.18$, and $R_2=0.07$ mbar/sec. In this example, an absolute value of the difference between the pressure values is used because the rate of change is used to determine a user input event, and not whether a second altitude is greater than or less than a first altitude.

At 812, the control module 112 may determine, based on the second rate of change being less than the threshold rate of change, an altitude. For example, the threshold rate of change $R_T$ may be 2.5 mbar/sec, and because $R_2$ is less than $R_T$, then the change in air pressure over the second time period as indicated by the second plurality of measurements is determined to be a result of a change in altitude. A difference between the third pressure value and the fourth pressure value equal to 0.07 mbar may be associated with a change in altitude of 0.5 m. In this example, pressure data 832 indicates an altitude for the wearable device as 0.5 m above sea level.

Figure 9:
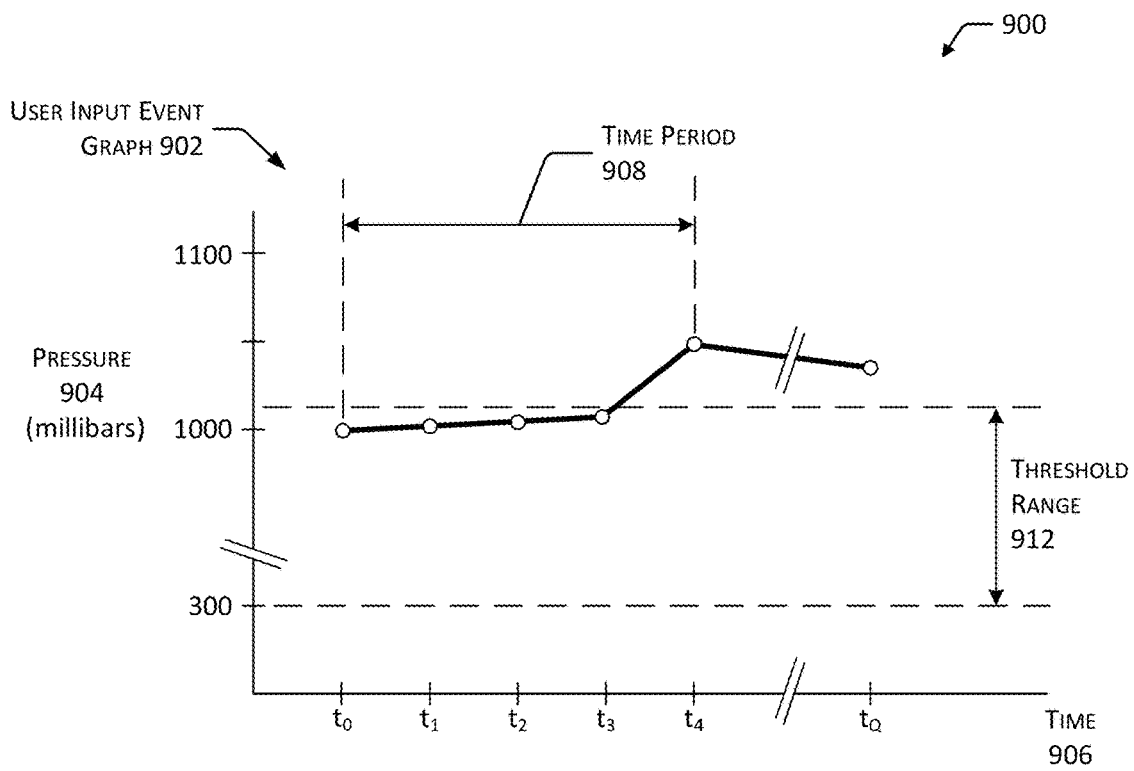
FIG. 9 illustrates charts of rates of change in air pressure used to determine a user input event, according to one implementation.
Figure 9:
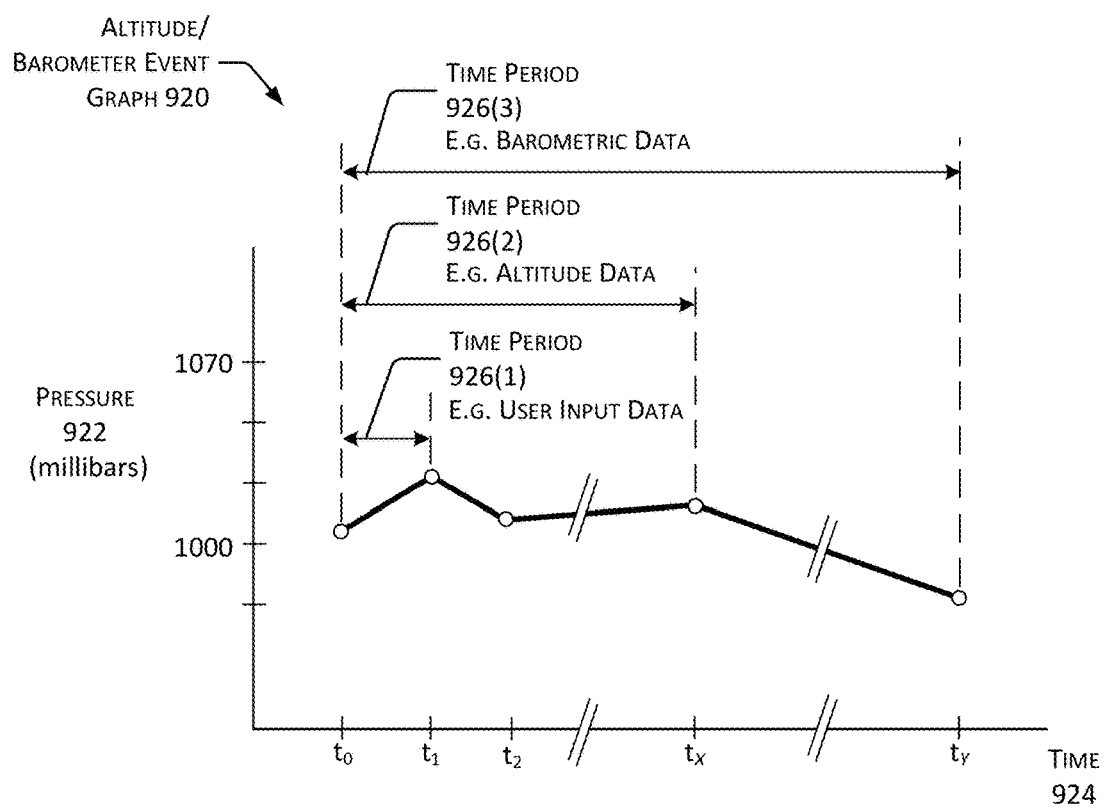

FIG. 9 illustrates charts of rates of change in air pressure used to determine a user input event, according to one implementation.

As shown at 900, two graphs depict pressure values over time that are used to determine whether the pressure values indicate user input or indicate a change in altitude or weather. A user input event graph 902 depicts a relatively fast rate of change in air pressure indicating a user input event. In comparison, an altitude/barometer event graph 920 depicts a relatively slow rate of change in air pressure indicating a change in pressure values due to a change in altitude or barometric effects.

Graph 902 depicts pressure values that may be used in two different techniques to determine a user input event. The x-axis indicates pressure 904 in millibars, and the y-axis indicates time 906. A first technique determines a user input event based on a rate of change in air pressure measurements being greater than a threshold rate of change in air pressure. A second technique determines a user input event based on a single pressure value being greater than or less than pressure values within an expected threshold range 912.

As shown in graph 902, and with respect to the first technique, there is a first plurality of pressure values within a time period 908. A rate of change in air pressure over the time period 908 may be determined using the first plurality of pressure values. For example, a pressure sensor 108 may determine a first plurality of measurements used to indicate or be used to determine the fourth plurality of pressure values. The time period 908 may include multiple points in time over the course of the first time period 908, including $t_0-t_4$.

At the first time, $t_0$, air pressure may be 1013 mbars, which is air pressure at sea level. The fifth time is associated with a pressure value of about 1050 mbars, which is associated with air pressure about 300 meters below the lowest elevation on Earth. In this example, the highest pressure value of the first plurality of pressure values is greater than an upper range of the threshold range 912 and is not associated with an expected change in a user's altitude. In this example, the time period 908 is 1 second. A first rate of change in air pressure may be $(1050-1013)/1.0=37$ mbar/sec. A threshold rate of change may be 2.5 mbar/sec, as described with respect to FIG. 1. In this example, because 37 mbar/sec is greater than 2.5 mbar/sec, the first plurality of measurements is determined to be a user input event.

As also shown in graph 902, and with respect to the second technique, a single air pressure value may be used to determine a user input event. For example, at time $t_0$, a pressure sensor 108 in the wearable device 104 may use a measurement that indicates or is used to determine a single air pressure value. If the pressure value at time $t_0$ is greater than or less than pressure values within threshold range 912, then the pressure value at time $t_0$ is determined to be a user input event. In this example, the threshold range 912 is specified to be 300-1080 mbars, which includes air pressures ranging from about 100 meters above the highest land elevation to about 100 meters below the lowest land elevation. In other examples, other pressure ranges may be specified. In other examples, if the pressure value at time $t_0$ were less than a threshold value at an upper range of the threshold range 912, then the pressure value at time $t_0$ would be determined to be associated with a current altitude, and the control module 112 may determine an altitude value.

Graph 920 depicts three time periods 926(1-3). The x-axis indicates pressure 922 in millibars, and the y-axis indicates time 924. Measurements over each of the three time periods 926(1-3) may be used for determining one or more of: a user input event, a change in altitude, or barometric changes. In this example, a first time period 926(1) may include a first plurality of pressure values, a second time period 926(2) may include a second plurality of pressure values, and a third time period 926(3) may include a third plurality of pressure values.

The first time period 926(1) is a time period associated with a span of time over which a user input event may occur. For example, a user intending to provide a button press input may typically be expected to begin and complete the action to provide the button press in under 1 second. In this example, the first time period 926(1) is 1 second, but other spans of time may be specified for different types of user inputs. For example, a time period may be specified for a double-press user input event, a time period may be specified for a press-and-hold user input event, and so forth.

The second time period 926(2) is a time period associated with a span of time over which changes in pressure may be associated with a change in altitude. For example, if a user is jogging over terrain that includes changes in elevation, then air pressure changes over the span of a few minutes may be expected to be changes in altitude. As one example, the second time period 926(2) may be between 3 and 10 minutes. In other examples, other lengths for the second time period 926(2) may be specified.

The third time period 926(3) is a time period associated with a span of time over which changes in pressure may be associated with barometric changes. For example, air pressure changes associated with changes in weather may be more accurately determined over longer spans of time. In this example, the third time period 926(3) may be 20 minutes, but other spans of time may be specified.

Graph 920 depicts a chart of a rate of change in air pressure that may be used to determine that a plurality of measurements of a pressure sensor is an altitude change event. For example, a pressure sensor 108 may determine a second plurality of measurements. The second plurality of measurements may indicate or be used to indicate the second plurality of pressure values over the time period 926(1). The time period 926(1) may include multiple points in time over the course of the time period 926(1), including $t_0$ and $t_1$.

At the first time, $t_0$, air pressure may be 1013.18 mbars, which is air pressure at sea level. The second time, $t_1$, is associated with air pressure that is about 1013.25 mbars, which is associated with air pressure about 0.5 meters above sea level. In this example, the first time period is 1 second. A first rate of change in air pressure may be (1013.25−1013.18)/1.0=0.07 mbar/sec. A threshold rate of change may be 2.5 mbar/sec, as described with respect to FIG. 1. In this example, because 0.07 mbar/sec is less than 2.5 mbar/sec, the second plurality of measurements is determined to be an altitude change event.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A wearable device comprising:
a support structure that retains the wearable device proximate to a user;
a housing comprising a cavity, wherein the cavity comprises one or more sides;
a sensor assembly comprising:
   a first piece having at least a first portion within the cavity;
   a first seal between a perimeter of the first piece and the one or more sides of the cavity, wherein a first volume of air is bounded by one or more portions of: the first piece, the first seal, and the cavity; and
   a sensor responsive to air pressure within the cavity; and
electronic circuitry to:
   determine first pressure data comprising a first plurality of measurements from the sensor over a first time period;
   determine, using the first pressure data, a first rate of change in air pressure within the cavity;
   determine, based on the first rate of change being greater than or equal to a threshold rate of change, occurrence of a user input event;
   determine second pressure data comprising a second plurality of measurements from the sensor over a second time period;
   determine, using the second pressure data, a second rate of change in air pressure within the cavity; and
   determine, based on the second rate of change being less than the threshold rate of change, an altitude of the wearable device.

2. The wearable device of claim 1, wherein:
the first piece comprises a passageway between the first volume of air in the cavity and an ambient environment, and
the first volume of air is further bounded by a user covering the passageway as force is applied to the first piece.

3. The wearable device of claim 1, further comprising:
a passageway between the cavity and an ambient environment, whereby a pressure differential between the first volume of air and the ambient environment is equalized via the passageway.

4. A portable device comprising:
a housing;
a cavity having one or more sides;
a sensor within the housing, wherein the sensor measures air pressure within at least a portion of the cavity; and
electronic circuitry to:
   determine, using the sensor at a first time, first data indicative of first air pressure within the cavity;
   determine, using the sensor at a second time, second data indicative of second air pressure within the cavity;
   determine, based on the first data and the second data, a rate of change of air pressure within the cavity;
   if the rate of change is greater than or equal to a threshold rate of change, determine occurrence of a user input event based on the first data and on the second data; and
   if the rate of change is less than the threshold rate of change, determine occurrence of a change associated with an ambient environment.

5. The portable device of claim 4, further comprising:
a support structure that retains the portable device proximate to a user, wherein the support structure comprises at least one of: a wrist band, an arm band, an ankle band, a headband, eyeglasses, or an abdominal strap.

6. The portable device of claim 4, the electronic circuitry further to:
determine, based on the rate of change being less than the threshold rate of change, a change in one or more of altitude or weather.

7. The portable device of claim 4, the electronic circuitry further to:
determine, based on the second data being less than a threshold value, an altitude value.

8. The portable device of claim 4, further comprising:
a first piece having a first portion within the cavity;
a seal between the first piece and the one or more sides of the cavity, wherein the seal is flexible; and
wherein a volume of air measured by the sensor is bounded by one or more portions of: the first piece, the one or more sides of the cavity, and the seal.

9. The portable device of claim 4, further comprising:
a first piece having a first portion within the cavity, wherein the first piece comprises a passageway between the ambient environment and a volume of air within the cavity.

10. The portable device of claim 9, wherein an outlet of the passageway is arranged within an area on a surface of the first piece that is associated with contact with a portion of a user during input.

11. The portable device of claim 4, further comprising:
a first piece having a first portion within the cavity, wherein the first piece permits movement of air between the at least a portion of the cavity and the ambient environment.

12. The portable device of claim 4, further comprising:
an elastomeric material that is overmolded to at least a portion of the housing and extends over at least a portion of the cavity, wherein a volume of air is bounded by one or more portions of: the elastomeric material and the one or more sides of the cavity.

13. The portable device of claim 4, further comprising:
a band attached to the housing, wherein the band comprises an elastomeric material, and wherein the cavity is within the band; and
a passageway between the ambient environment and a volume of air within the cavity.

14. The portable device of claim 4, further comprising:
a first piece having a first portion outside the cavity, wherein the first piece is attached to a sensor assembly that comprises the sensor,
wherein a volume of air is bounded by one or more portions of: the sensor assembly, the one or more sides of the cavity, and a seal, and
wherein the seal is positioned around a perimeter of the sensor assembly and between the sensor assembly and the one or more sides of the cavity, and wherein the seal is flexible.

15. A method comprising:
determining, using a sensor responsive to pressure, first air pressure at a first time within a cavity of a portable device;
determining, using the sensor, second air pressure at a second time within the cavity;
determining a rate of change in air pressure based on the first air pressure and the second air pressure;
if the rate of change is greater than or equal to a first threshold value, determining occurrence of a first user input event; and if the rate of change is less than the first threshold value, determining occurrence of a change associated with an ambient environment.

16. The method of claim 15, wherein the occurrence of the first user input event is further determined based on one or more of: the first air pressure exceeding a second threshold value or the second air pressure exceeding the second threshold value.

17. The method of claim 15, further comprising:
determining, based on the second air pressure being less than a second threshold value, an altitude value.

18. The method of claim 15, further comprising:
determining, based on the rate of change not exceeding one or more of the first threshold value or a second threshold value, an altitude value.

19. The method of claim 15, wherein the change associated with the ambient environment is further determined based on one or more of: the first air pressure exceeding a second threshold value or the second air pressure exceeding the second threshold value.

20. The method of claim 15,
wherein one or more of the occurrence of the first user input event or the occurrence of the change associated with the ambient environment is further determined based on one or more of: the first air pressure, the second air pressure, or a second threshold value.

* * * * *